Feb. 6, 1923. 1,444,492.
A. O. BENSON.
WHEEL.
FILED MAY 24, 1922.

WITNESSES
R. S. Rousseau

INVENTOR
A. O. Benson,
BY
ATTORNEYS

Patented Feb. 6, 1923.

1,444,492

UNITED STATES PATENT OFFICE.

ANDREW OSCAR BENSON, OF LOS ANGELES, CALIFORNIA.

WHEEL.

Application filed May 24, 1922. Serial No. 563,285.

*To all whom it may concern:*

Be it known that I, ANDREW OSCAR BENSON, a citizen of the United States, and a resident of Los Angeles, in the county of Los Angeles and State of California, have invented certain new and useful Improvements in Wheels, of which the following is a specification.

This invention relates to wheels especially adapted for use on motor vehicles, although not necessarily restricted to such use.

Briefly stated an important object is to provide a vehicle wheel having a high degree of resiliency so that the necessity of employing pneumatic tires is overcome.

A further object is to provide a resilient wheel having means associated therewith to limit the spring action of the wheel and to limit the side thrust so that the breaking of the wheel is positively prevented, and the said means also constitutes a bracing element for the spokes of the wheel.

A further object is to provide a resilient wheel which is neat in appearance, of highly simplified construction and cheap to manufacture.

Other objects and advantages of the invention will be apparent during the course of the following description.

Figure 1:
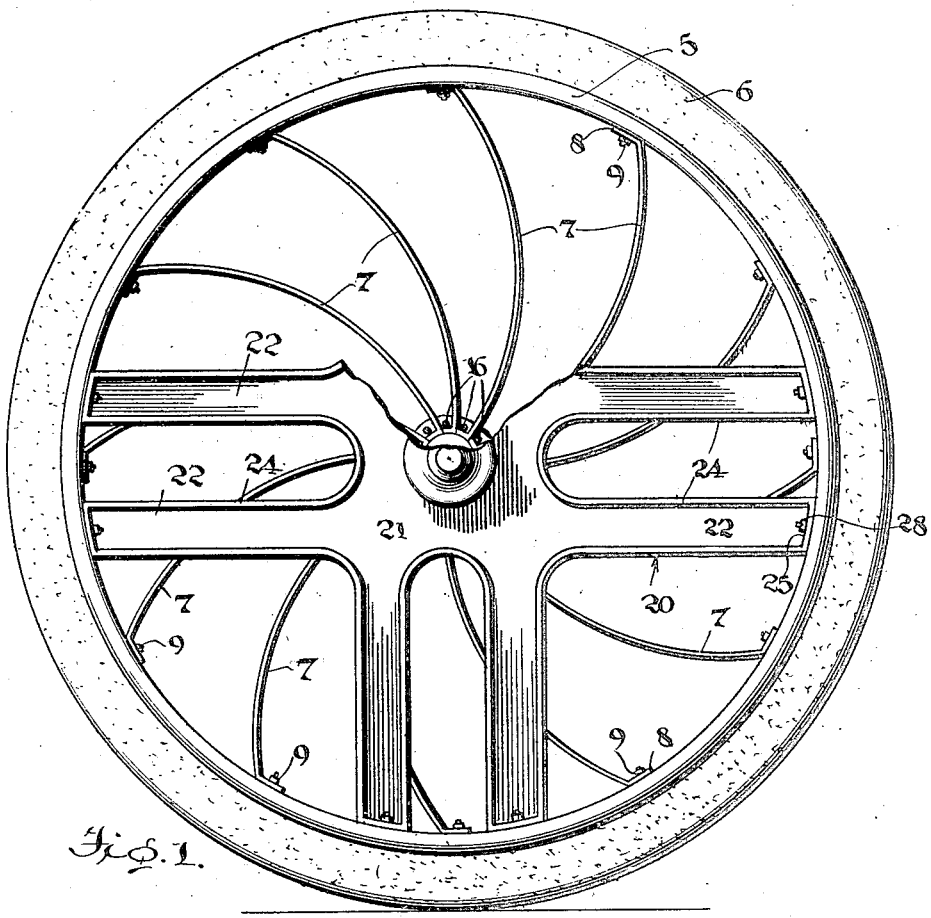
Figure 2:
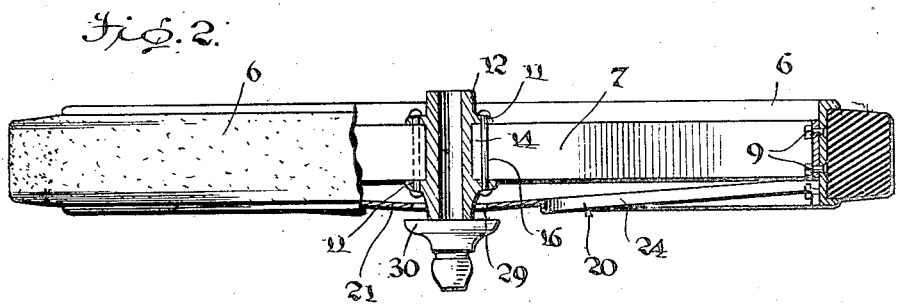

In the accompanying drawing forming a part of this application and in which like numerals are employed to designate like parts throughout the same, Figure 1 is a side elevation of the improved wheel, parts being broken away, Figure 2 is a plan view of the wheel, parts being broken away to illustrate the hub construction.

In the drawing wherein for the purpose of illustration is shown a preferred embodiment of the invention numeral 5 designates a felly about which a solid tire 6 is arranged.

In carrying out the invention a plurality of longitudinal curved spokes 7 have their outer ends formed with angular directed attaching plates 8 secured to the inner side of the felly by means of fastening devices 9. It will be observed that the fastening devices 9 which are in the nature of nuts and bolts permit the spokes to be disconnected from the felly at any time it is desired to replace the spokes or to repair the same.

Figure 1 illustrates that the inner ends of the spokes 7 are confined between flanges 11 formed integral with a hub 12. Specifically the inner ends of the spokes 7 are provided with angular directed attaching portions 14 over which fastening bolts or pins 16 are extended. It will be seen that the attaching pins 16 form a reliable means whereby the attaching portions 14 may be completely secured to the hub. Attention is also directed to the fact that the attaching portion 14 of one plate is snugly arranged between the attaching portions of the adjacent spokes so that each attaching portion is held against circumferential movement by the adjacent attaching portions. Also the pins 16 form a positive means for holding the attaching portions 14 against movement circumferentially of the hub. In summarizing the connecting means of the spokes it will be seen that the attaching portions 14 are held against lateral movement by the flanges 11 and are held against circumferential movement by the pins 16 and by the fact that the several attaching portions 14 flatly engage each other and extend entirely around the periphery of the hub.

Excessive spring action is prevented by means of a bracing member 20 which as illustrated in Figure 1 consists of a web shaped portion or hub 21 from which pairs of spaced parallel attaching arms 22 radiate. The pairs of spaced parallel attaching arms 22 are formed of spring metal and having their adjacent edges formed with reinforcing flanges 24. The longitudinally extending flanges 24 have their ends formed integral with end flanges 25 flatly secured to the felly by means of fastening devices 28.

Figure 2 illustrates that the web portion 21 is formed with an opening 29 to freely receive the hub 12 and when excessive spring action occurs, the hub 12 will contact with one wall of the opening 29. It will be seen that the hub 12 is provided with an enlargement 30 which cooperates with the adjacent flange 11 in limiting the lateral movement of the hub with relation to the member 20. That is to say the hub 12 cannot move laterally of the wheel as the result of strain beyond the limits permitted by the flange 30 and the adjacent flange 11. This greatly strengthens and reinforces the wheel and thereby prevents the collapse of the same as the result of unusual strain.

Attention is also directed to the fact that the pair of spaced parallel arms 22 form a reliable means for protecting the spokes 7 against damage as the result of contact with various objects.

With reference to the foregoing description taken in connection with the accompanying drawing it will be seen that a wheel constructed in accordance with this invention not only overcomes the necessity of employing pneumatic tires, but may be used without the possibility of an accident, and furthermore the improved wheel is possessed of very superior riding qualities.

Having thus described the invention, what is claimed is:—

1. A wheel comprising a felly, a plurality of yieldable spokes connected with the felly, a hub connected to said spokes, a bracing member having an opening freely receiving said hub, the wall of said opening constituting a means to limit the movement of the hub, and flanges carried by said hub on opposite sides of said member and forming a means to limit the longitudinal movement of the hub with relation to said member, said bracing member being provided with pairs of parallel attaching arms secured to the felly of said wheel.

2. A wheel comprising a felloe, spring spokes connected to said felloe, a hub having spoke fastening means, a radial flange carried by said hub in spaced relation to said spoke fastening means, and a felloe carried member arranged between and normally in spaced relation to said spoke fastening means and said flange and limiting the movement of the hub laterally of the wheel, said felloe carried member having a web portion formed with an opening freely receiving said hub, the wall of said opening being adapted to engage said hub, whereby to limit the yielding action of the spring spokes.

ANDREW OSCAR BENSON.